United States Patent
Kim et al.

(10) Patent No.: US 9,686,094 B2
(45) Date of Patent: Jun. 20, 2017

(54) METHOD AND APPARATUS FOR CONTROLLING DEVICES FOR SMART HOME SERVICE

(71) Applicant: Samsung Electronics Co., Ltd., Suwon-si, Gyeonggi-do (KR)

(72) Inventors: Jun-Hyung Kim, Yongin-si (KR); Dong-Keon Kong, Suwon-si (KR); Se-Hoon Kim, Seoul (KR); Eun-Hui Bae, Seoul (KR); Jai-Ick Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/484,729

(22) Filed: Sep. 12, 2014

(65) Prior Publication Data

US 2015/0087278 A1 Mar. 26, 2015

Related U.S. Application Data

(60) Provisional application No. 61/881,114, filed on Sep. 23, 2013.

(30) Foreign Application Priority Data

May 19, 2014 (KR) .......................... 10-2014-0059632

(51) Int. Cl.
  *H04M 3/42* (2006.01)
  *H04L 12/28* (2006.01)
(52) U.S. Cl.
  CPC ........ *H04L 12/2818* (2013.01); *H04L 12/282* (2013.01); *H04L 12/2838* (2013.01)

(58) Field of Classification Search
  CPC ....................................................... H04W 8/18
  USPC ..................................................... 455/414.1
  See application file for complete search history.

(56) References Cited

U.S. PATENT DOCUMENTS

| | | | |
|---|---|---|---|
| 2001/0038392 A1 | 11/2001 | Humpleman et al. | |
| 2003/0079001 A1* | 4/2003 | Chamberlain | ................ 709/220 |
| 2005/0128048 A1 | 6/2005 | Krzyzanowski et al. | |
| 2006/0154642 A1 | 7/2006 | Scannell, Jr. | |
| 2011/0046805 A1* | 2/2011 | Bedros et al. | ................ 700/291 |
| 2011/0196547 A1* | 8/2011 | Park et al. | ................ 700/296 |
| 2011/0208359 A1* | 8/2011 | Duchene | ................ G05B 15/02 |
| | | | 700/275 |
| 2011/0301943 A1* | 12/2011 | Patch | ................ 704/9 |

(Continued)

FOREIGN PATENT DOCUMENTS

| WO | 2011/106382 A2 | 9/2011 |
|---|---|---|
| WO | 2013/095044 A1 | 6/2013 |

*Primary Examiner* — Santiago Garcia
(74) *Attorney, Agent, or Firm* — Jefferson IP Law, LLP

(57) ABSTRACT

A method and apparatus for controlling devices for a smart home service are provided. The method includes grouping devices to receive at least one command simultaneously from among devices registered to the smart home service into a group for one mode, generating mode configuration information for each mode including grouped devices for the mode and at least one command for the mode, transmitting the mode configuration information for each mode to the registered devices, selecting one of each mode for which the mode configuration information has been generated, and transmitting a mode activation request for activating the selected mode to the registered devices.

26 Claims, 14 Drawing Sheets

(56) References Cited

U.S. PATENT DOCUMENTS

| | | | |
|---|---|---|---|
| 2012/0023212 A1* | 1/2012 | Roth et al. | 709/223 |
| 2013/0082827 A1* | 4/2013 | Cho et al. | 340/12.52 |
| 2013/0151024 A1* | 6/2013 | Bae et al. | 700/295 |
| 2013/0159490 A1* | 6/2013 | Huh et al. | 709/223 |
| 2013/0167134 A1 | 6/2013 | Shim et al. | |
| 2013/0173811 A1 | 7/2013 | Ha et al. | |
| 2013/0185813 A1 | 7/2013 | Shim et al. | |
| 2013/0332565 A1* | 12/2013 | Wang | H04L 67/06 709/217 |
| 2014/0011483 A1* | 1/2014 | Baumert et al. | 455/414.1 |
| 2014/0112151 A1* | 4/2014 | Olsson et al. | 370/237 |
| 2014/0349269 A1* | 11/2014 | Canoy et al. | 434/322 |
| 2015/0026779 A1* | 1/2015 | Ilsar et al. | 726/5 |
| 2015/0071052 A1* | 3/2015 | Hershberg et al. | 370/216 |
| 2015/0071216 A1* | 3/2015 | Ilsar et al. | 370/329 |
| 2015/0098375 A1* | 4/2015 | Ree | 370/311 |

* cited by examiner

| Mode Configuration | | |
|---|---|---|
| Attribute<br>   - Description : Coming home<br>   - Enabled : False<br>   - Disposable : False | | |
| Command | | |
| Device : Aircon<br>Action : Power on | Device : Light<br>Action : Power on | Device : TV<br>Action : Power on |

FIG.3

| Mode Configuration | | |
|---|---|---|
| Attribute<br>   - Description : Watching movie<br>   - Enabled : False<br>   - Disposable : False | | |
| Command | | |
| Device : Light 1<br>         Light 2<br>Action : Dim 2 | Device : Speaker<br>Action : Power on<br>         Volume 5 | |

FIG.4

| Request | Create new mode (create "Away Mode") |
|---|---|

```
POST /actions HTTP/1.1
Host: {IPv4Address}
X-API-Version: v1.5.0
Content-Type: application/json
Content-Length: {contentLength}
{
        "Action": {
                "description": "Away Mode")
                "enabled": false,
                "disposable": flase,
                "Actuator": [
                        {
                                "deviceID": "410e8400-e39b-0000-0000-000000000000",
                                           "550e8400-e29b-0000-0000-000000000000",
                                           "510f8310-e29b-0000-0000-000000000000",
                                ]
                                "Operation" : {
                                        "power" : "Off"
                                }
                        }
                ]
        }
}
```

| Request | |
|---|---|

```
HTTP/1.1 201 Created
X-API-Version: v1.5.0
Location: /actions/4
```

FIG.5

| Request | Add descriptio into the action #1 (Execute Away mode) |
|---|---|
| PUT /actions HTTP/1.1<br>Host: {IPv4Address}<br>X-API-Version: v1.5.0<br>Content-Type: application/json<br>Content-Length: {contentLength}<br>{<br>   "Action": {<br><br>      "enabled": true<br>   }<br>} | |
| Request | |
| HTTP/1.1 204 No Content | |

METHOD AND APPARATUS FOR CONTROLLING DEVICES FOR SMART HOME SERVICE

CROSS-REFERENCE TO RELATED APPLICATION(S)

This application claims the benefit under 35 U.S.C. §119 (e) of a U.S. Provisional application filed on Sep. 23, 2013 in the U.S. Patent and Trademark Office and assigned Ser. No. 61/881,114, and under 35 U.S.C. §119(a) of a Korean patent application filed on May 19, 2014 in the Korean Intellectual Property Office and assigned Serial number 10-2014-0059632, the entire disclosure of each of which is hereby incorporated by reference.

TECHNICAL FIELD

The present disclosure relates to a method and apparatus for controlling devices for a smart home service.

BACKGROUND

Owing to the development of wireless communication, all electrical and electronic appliances may be interconnected into a wired or wireless system, thus enabling interactive communication. The emergence of smartphones is a driving force behind the popularity of a smart home service that controls home devices through a smartphone. With the ever-increasing uses of smartphones, the smart home service gains more popularity in everyday living. Accordingly, research has been made on improvements for providing the smart home service more efficiently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling devices for a smart home service.

In accordance with an aspect of the present disclosure, a method for controlling devices for a smart home service is provided. The method includes grouping devices to receive at least one command simultaneously from among devices registered to the smart home service into a group for each mode, generating mode configuration information for each mode including the grouped devices for the mode and at least one command for the mode, transmitting the mode configuration information for each mode to the registered devices, selecting one of each mode for which the mode configuration information has been generated, and transmitting a mode activation request for activating the selected mode to the registered devices.

In accordance with another aspect of the present disclosure, a method for controlling devices for a smart home service is provided. The method includes determining, upon receipt of a mode activation request for activating a specific mode from a controller device, whether mode configuration information for the specific mode is included in pre-stored mode configuration information, executing a command indicated by the mode configuration information for the specific mode, in the presence of the mode configuration information for the specific mode, and transmitting a result of the command execution to the controller device.

In accordance with another aspect of the present disclosure, an apparatus for controlling devices for a smart home service is provided. The apparatus includes a controller configured to group devices to receive at least one command simultaneously from among devices registered to the smart home service into a group for each mode, to generate mode configuration information for each mode including the grouped devices for the mode and at least one command for the mode, to control a transceiver to transmit the mode configuration information for each mode to the registered devices, to select one of each mode for which the mode configuration information has been generated, and to control the transceiver to transmit a mode activation request for activating the selected mode to the registered devices.

In accordance with another aspect of the present disclosure, a device for a smart home service is provided. The device includes a controller configured to, upon receipt of a mode activation request for activating a specific mode from a controller device through a transceiver, determine whether mode configuration information for the specific mode is included in pre-stored mode configuration information, to execute a command indicated by the mode configuration information in the presence of the mode configuration information for the specific mode, and to control the transceiver to transmit a result of the command execution to the controller device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates mode configuration information configurable for a home-coming mode according to an embodiment of the present disclosure;

FIG. 4 illustrates mode configuration information configurable for a movie-watching mode according to an embodiment of the present disclosure;

FIG. 5 illustrates a Mode Configuration Setup Request/Response message according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
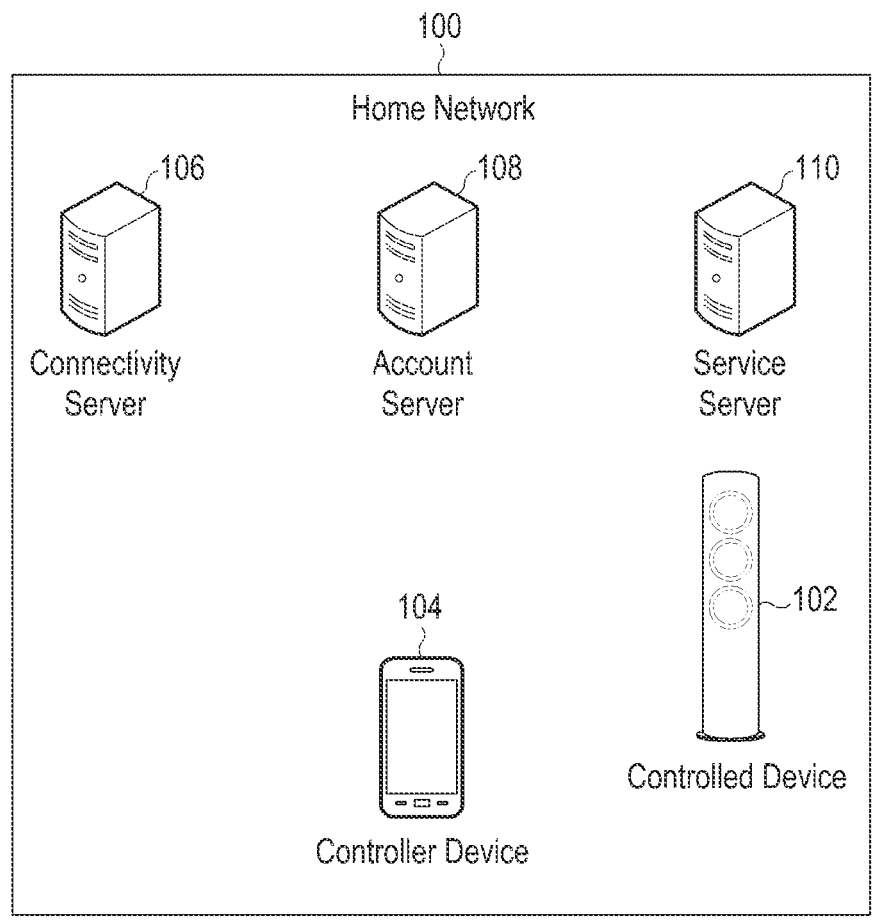
FIG. 1 illustrates a configuration of a home network that provides a smart home service, to which an embodiment of the present disclosure is applied according to an embodiment of the present disclosure.

FIG. 1 illustrates a configuration of a home network that provides a smart home service, to which an embodiment of the present disclosure is applied according to an embodiment of the present disclosure.

Referring to FIG. 1, a home network 100 may include, for example, a controller device 104, a controlled device 102, a connectivity server 106, an account server 108, and a service server 110, but is not limited thereto.

The controller device 104 checks a state of a home appliance that a user will use for the smart home service and controls the home appliance. The controller device 104 may be a mobile device such as a smartphone, a TeleVision (TV), or the like.

The controlled device 102 is controlled by the controller device 104. The controlled device 102 may be a home appliance such as a washer, an air conditioner, or the like. The account server 108 is a server that manages a user account of the controller device 104. Upon a user's log-in, the account server 108 connects the controller device 104 to the connectivity server 106 and the service server 120, using single user log-in information. The connectivity server 106 provides a service that may establish a communication channel for message transmission between the controller device 104 and the controlled device 102. The connectivity server 106 and the account server 108 are public servers available for other services as well as the smart home service.

The service server 110 is dedicated to the smart home service. The service server 110 stores and manages smart home device information so that the smart home device information may be retrieved. Also, the service server 110 may manage all information required to control smart home devices. A user may access the service server 110 by a smart home mobile application executed by the controller device 104, register or retrieve device information, and register, retrieve, and delete control information for en-bloc control of controlled devices for the smart home service.

Embodiments of the present disclosure provide a mode service for simultaneously controlling a plurality of devices using a single command by a controller device and a method for performing the mode service, in a smart home service. According to an embodiment of the present disclosure, an execution time of a command may be set in the mode service. Upon receipt of the single command, a home device may perform an operation corresponding to the command at a time set in the command, rather than immediately performing the operation. As a consequence, controlled devices may operate according to a user setting or a predetermined schedule in the smart home service. Further, the user may control a plurality of devices registered to the smart home service simultaneously by transmitting a single command to the devices based on preset information.

For the convenience of description, a mode service procedure according to an embodiment of the present disclosure will be described separately into a mode service creation procedure, a mode service configuration procedure, and a mode service implementation procedure. In the mode service creation procedure, a controller device may group a plurality of devices that a user wants to control simultaneously on a usage basis, for the smart home service and may select and set a function for each grouped device. The controller device generates and stores, for each mode, mode configuration information including device information (for example, device Identifiers (IDs)) about devices in each group and information about functions of the devices. In the mode service configuration procedure, the controller device transmits the mode configuration information for each mode generated in the mode service creation procedure to devices pre-registered to a home network and a service server so that the service server may store the mode configuration information. In the mode service implementation procedure, the controller device transmits a mode activation request at a user-desired time. Then, each of devices that have stored mode configuration information for a mode corresponding to the mode activation request from among devices receiving the mode activation request may perform the service at an execution time set in the mode configuration information.

Figure 2:
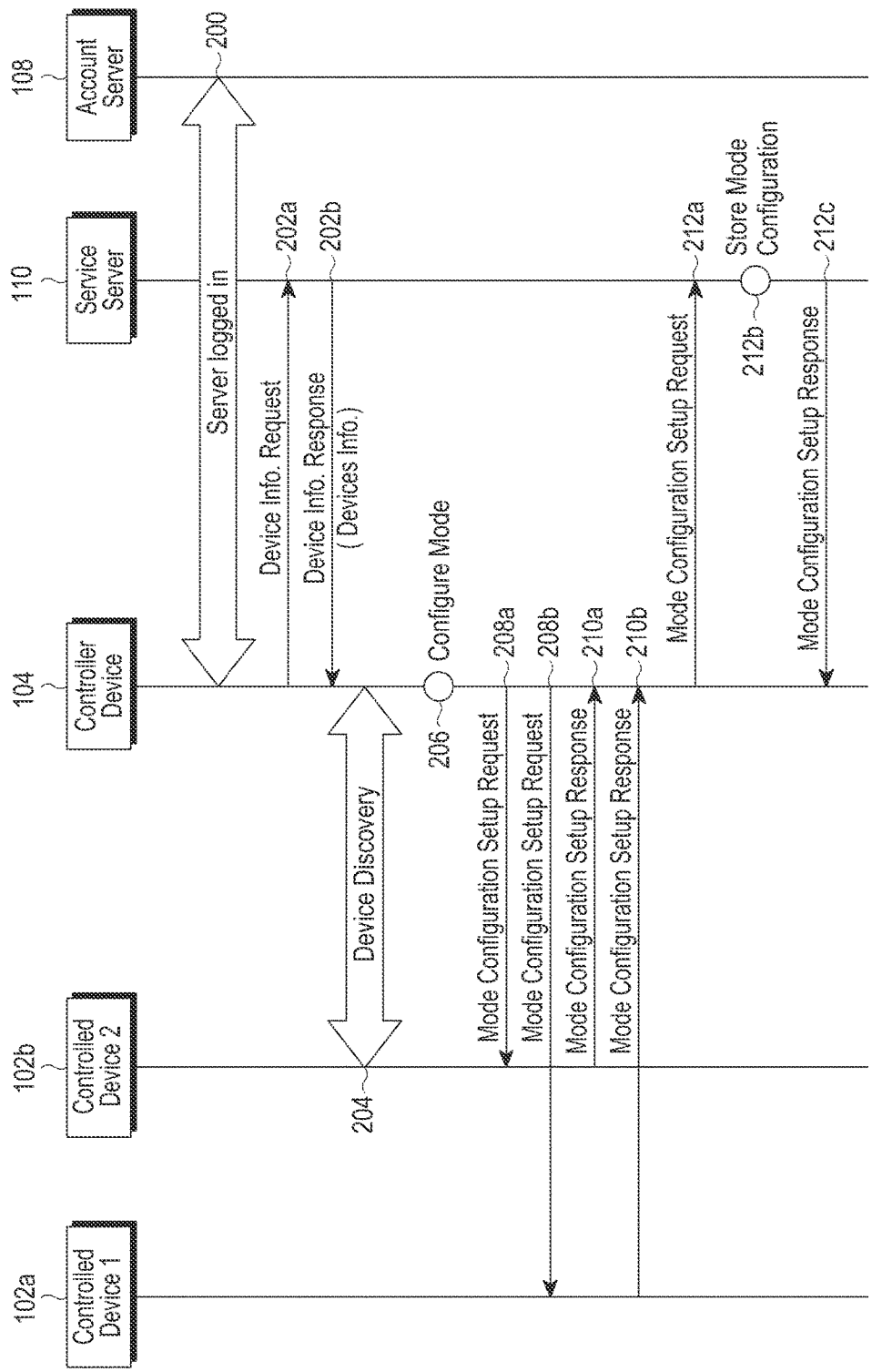
FIG. 2 is a diagram illustrating a signal flow for a mode service creation and configuration procedure according to an embodiment of the present disclosure.

FIG. 2 is a diagram illustrating a signal flow for a mode service creation and configuration procedure according to an embodiment of the present disclosure. It is assumed that a home network according to an embodiment of the present disclosure has, for example, the configuration illustrated in FIG. 1.

Referring to FIG. 2, the controller device 104 has logged in to the account server 108 and executed a smart home application in operation 200. A user may receive a service provided by the service server 110 in the logged-in state. In operation 202a, the controller device 104 transmits a Device Info. Request message to the service server 110 to acquire information about devices registered to the service server 110, for a smart home service. The controller device 104 receives a Device Info. Response message including device information about the registered devices from the service server 110 in operation 202b.

The controller device 104 then performs a device discovery operation to acquire detailed information and state information about controlled devices registered to the home network in which the controller device 104 is located, for example, the home network 100 illustrated in FIG. 1 using the device information in operation 204. For example, the controlled devices include a first controlled device (controlled device 1) 102a and a second controlled device (controlled device 2) 102b in the embodiment of the present disclosure illustrated in FIG. 2. The detailed information may specify model names, manufacturers, and specifications of the controlled devices and the state information may specify power-on/off states, operation states, and available/unavailable states of the controlled devices. The controller device 104 may determine the presence of a new device that has not been registered to the home network by the device discovery operation. In operation 206, the controller device 104 selects devices that the controller device 104 wants to operate simultaneously for each user situation and actions that the respective devices are supposed to perform, based on the device information. The devices and the actions for the devices, which are selected for each user situation, may be grouped into one group and a mode corresponding to the user situation may be assigned to the group. Modes corresponding to specific situations may include a home-coming mode in which the user returns to the home network, an away mode in which the user is away, a sleep/home-coming mode for sleep or wake-up in the home network, a movie-watching mode in which the user watches a movie in the home network, and the like. The controller device 104 may store information about the foregoing selected devices and actions for the devices, for each mode, as mode configuration information for the mode in operation 206. Specifically, the mode configuration information for each mode may be configured as illustrated in FIGS. 3 and 4.

FIG. 3 illustrates mode configuration information configurable for the home-coming mode according to an embodiment of the present disclosure.

Referring to FIG. 3, the mode configuration information for the home-coming mode may include, for example, attribute information and command information. The attribute information may include "description" indicating the name of the home-coming mode, "enabled" indicating whether a command is to be executed immediately in each device, and "disposable" indicating whether the command is to be reused. In the illustrated case of FIG. 3, "enabled" is set to "false" indicating that the command is to be executed at the time of a service request, and "disposable" is set to "false" indicating that the command is to be kept without being deleted after it is executed. If "enabled" is set to "true", this indicates immediate execution of the command and if "disposable" is set to "true", this means deletion of the command shortly after execution, indicating that the command is disposable. The same attribute information is set for devices selected for the home-coming mode, for example, the three devices of an air conditioner, a light, and a TV in the embodiment of the present disclosure. However, it may be further contemplated as another embodiment that different attribute information may be set for the respective selected devices. The command includes, for example, device information "device" for the selected three devices and information about an operation to be performed, "action". While it has been described above that the same action "power on" is set for the three devices, by way of example, different actions may be set for all or a part of the devices.

FIG. 4 illustrates mode configuration information configurable for the movie-watching mode according to an embodiment of the present disclosure.

Referring to FIG. 4, the mode configuration information for the movie-watching mode may also include attribute information and command information. The attribute information may include "description" set to "watching movie", "enabled" set to "false", and "disposable" set to "false. In the illustrated case of FIG. 4, the same attribute information is set for devices selected for the movie-watching mode, for example, the two devices of a light and a speaker. However, it may be further contemplated as another embodiment that different attribute information may be set for the respective selected devices. The command includes "action" set to different values for the light and the speaker. For example, the action of the light is set to "Dim 2" indicating a preset dark lighting state for movies and the action of the speaker is set to "Power on" and "Volume 5" indicating a volume level.

In operations 208a and 208b, the controller device 104 transmits a Mode Configuration Setup Request message including the mode configuration information for each mode generated and stored in operation 206 to the registered devices. In an embodiment of the present disclosure, the controller device 104 may broadcast the mode configuration information to the registered devices. For example, if the registered devices include controlled device 1 102a and controlled device 2 102b, the Mode Configuration Setup Request message including the mode configuration information for each mode is transmitted to both controlled device 1 102a and controlled device 2 102b. In another embodiment of the present disclosure, the Mode Configuration Setup Request message may be transmitted to the registered devices sequentially in a predetermined order or may be relayed to the registered devices. The transmission schemes of the controller device 104 for controlled device 1 102a and controlled device 2 102b will be described later in greater detail with reference to FIGS. 9A to 10C.

Upon successful receipt of the mode configuration information for each mode in the Mode Configuration Setup Request message, controlled device 1 102a and controlled device 2 102b store the mode configuration information for each mode. According to some embodiments, upon receipt of the mode configuration information, a controlled device may determine whether a corresponding device ID is included in any mode configuration information and store mode configuration information for a mode including a corresponding device ID from among the received mode configuration information.

For example, it is assumed that controlled device 1 102a acquires mode configuration information for each of the home-coming mode and the movie-watching mode described with reference to FIGS. 3 and 4 from the Mode Configuration Setup Request message. If both the mode configuration information for the home-coming mode and the mode configuration information for the movie-watching mode include the device ID of controlled device 1 102a, controlled device 1 102a stores the mode configuration information for the home-coming mode and the mode configuration information for the movie-watching mode. In another embodiment, both controlled device 1 102a and controlled device 2 102b may already receive mode configuration information for different modes from another controller device authorized to use the smart home service of the home network 100 and store the mode configuration information, before receiving the Mode Configuration Setup Request message. Or both controlled device 1 102a and controlled device 2 102b may already receive mode configuration information for different modes, which has been set previously, from the controller device 104 and store the mode configuration information. In this case, mode configuration information for the same mode may be stored separately by user or by controller device. For example, the mode configuration information for the same mode may be mapped to user IDs. Then if a user transmits a mode activation request for a specific mode, including the ID of the user or the ID of a controller device, to a specific controlled device, the specific controlled device may detect mode configuration information for the specific mode, mapped to the user or the controller device and activate the mode according to the detected mode configuration information.

Subsequently, controlled device 1 102a and controlled device 2 102b transmit Mode Configuration Setup Response messages respectively to the controller device 104 to confirm the reception of the mode configuration information for each mode from the controller device 104 in operations 210a and 210b.

FIG. 5 illustrates an exemplary Mode Configuration Setup Request/Response message according to an embodiment of the present disclosure.

Referring to FIG. 5, the Mode Configuration Setup Request message according to the embodiment of the present disclosure requests creation of, for example, the away mode as a new mode and includes "deviceID" identifying devices registered to the home network and "Operation" set to "power off". The afore-described attributes of each action, "enabled" and "disposable" are both set to "false". The Mode Configuration Setup Response message includes, in a Location header, a mode ID (for example, "4") assigned to the away mode by a device that has configured mode configuration information for the away mode.

According to another embodiment, the controller device and the controlled devices may already have mode configuration information generated by the controller device.

In operation 212a, the controller device 104 transmits a Mode Configuration Setup Request message including the mode configuration information for each mode generated in operation 206 to the service server 110. Unlike the Mode Configuration Setup Request message transmitted to the registered devices, the Mode Configuration Setup Request message transmitted to the service server 110 includes a mode ID assigned to each mode, acquired from the Mode Configuration Setup Response messages received from the registered devices after the mode configuration information is configured. Then the service server 110 stores the received mode configuration information for each mode in operation 212b and transmits the stored mode configuration information in a Mode Configuration Setup Response message to the controller device 104 that has configured the mode configuration information in operation 212c. According to some embodiments, the service server 110 may also transmit the Mode Configuration Setup Response message including the stored mode configuration information to smartphones authorized to access the service server 110. The service server 110 may use the mode ID of each mode as the name of an action associated with the mode. The service server 110 may identify the modes by their mode IDs along with the controller device and the controlled devices.

Figure 6:
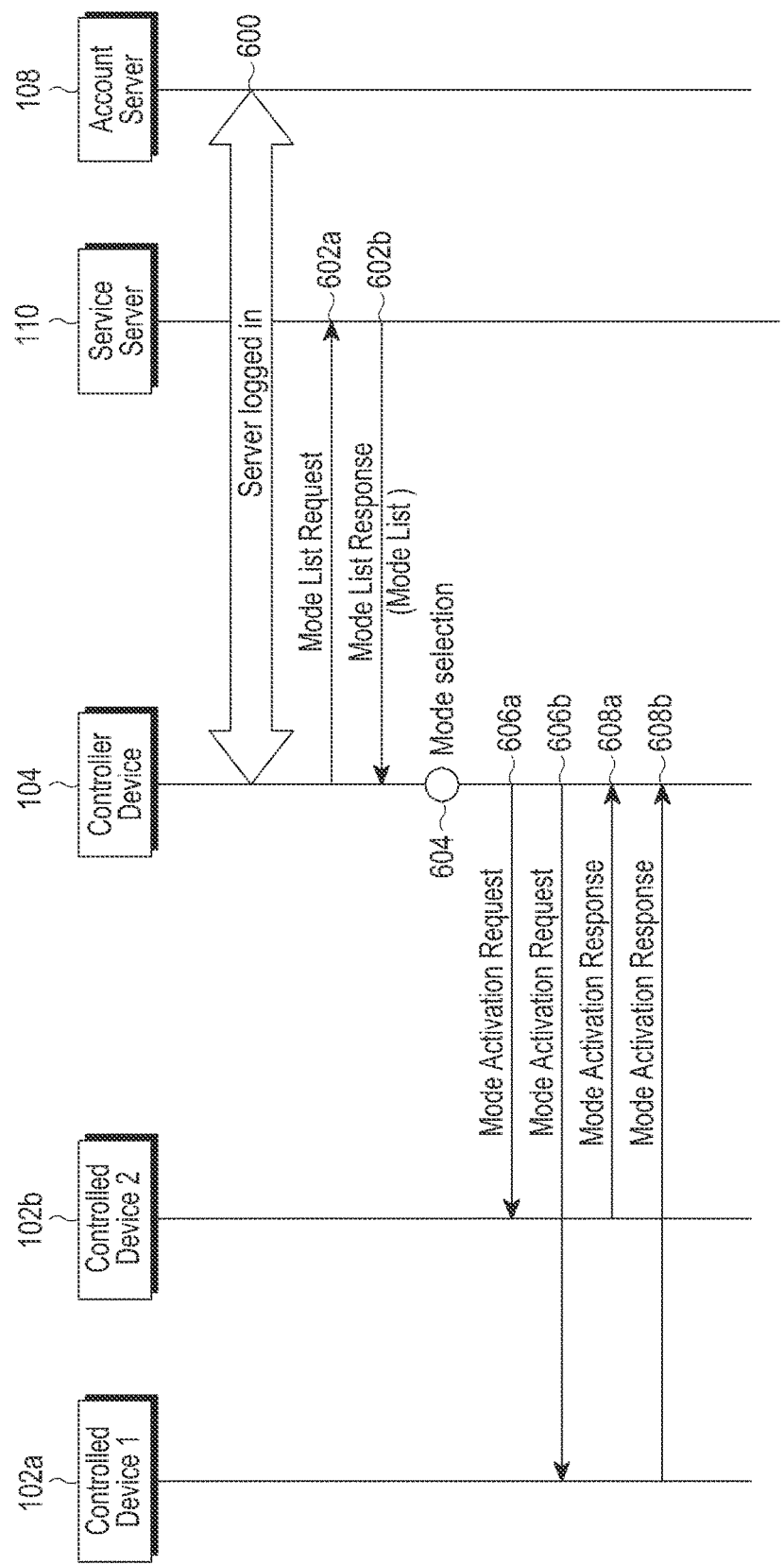
FIG. 6 is a diagram illustrating a signal flow for a mode service activation procedure of a controller device according to an embodiment of the present disclosure.

FIG. 6 is a diagram illustrating a signal flow for a mode service implementation procedure of a controller device according to an embodiment of the present disclosure. For the convenience of description, a home network according to the embodiment of the present disclosure has, for example, the configuration illustrated in FIG. 1. The registered controlled devices and the service server have stored the mode configuration information for each mode, as the controller device performs the operations of FIGS. 2 to 5 according to the embodiment of the present disclosure. Therefore, the controller device of the user authorized to access the service server 110, for example, a smartphone may receive the stored mode configuration information from the service server 110. Or in the presence of the stored mode configuration information in the smartphone, the smartphone does not need to receive the mode configuration information from the service server 110.

Referring to FIG. 6, the controller device 104 has logged in to the account server 108 and executed a smart home application in operation 600. The controller device 104 may be identical to the controller device 104 illustrated in FIG. 2 that has transmitted the mode configuration information to the service server 110. Or the controller device 104 may be different from the controller device 104 illustrated in FIG. 2 authorized to access the service server 110, which has transmitted mode configuration information in the manner of FIG. 2. The service server 110 may store mode configuration information for each mode separately by user or by controller device by mapping the mode configuration information to user IDs.

In operation 602a, the controller device 104 transmits a Mode List Request message to the service server 110, requesting a list of modes corresponding to the stored mode configuration information. In this case, the controller device 104 may include a user ID in the Mode List Request message. Upon receipt of the Mode List Request message, the service server 110 may detect mode configuration information for each mode, mapped to the user ID acquired from the Mode List Request message and may make a mode list with modes corresponding to the detected mode configuration information. The controller device 104 receives the mode list from the service server 110 in operation 602b.

The mode list may be displayed on an execution screen of the smart home application in the controller device 104. The controller 104 then selects a mode to be activated from the displayed mode list in operation 604 and transmits a Mode Activation Request message to the registered devices, requesting activation of the selected mode in operations 606a and 606b. Like transmission of the mode configuration information for each mode in operations 208a and 208b, the Mode Activation Request message may be broadcast to the registered devices, may be transmitted to the registered devices simultaneously or sequentially in a predetermined order, or may be relayed to the registered devices. The transmission schemes of the controller device 104 for controlled device 1 102a and controlled device 2 102b will be described later in greater detail with reference to FIGS. 9A to 10C.

If the registered devices include controlled device 1 102a and controlled device 2 102b, both controlled device 1 102a and controlled device 2 102b receive the Mode Activation Request message. A mode ID assigned to the selected mode may be included in the Mode Activation Request message so that the mode may be identified.

Upon receipt of the Mode Activation Request message, each of controlled device 1 102a and controlled device 2 102b checks the mode ID included in the Mode Activation Request message and determines whether a corresponding device ID is included in mode configuration information corresponding to the mode ID from among mode configuration information stored in the controlled device. If the device ID of the controlled device is included in the mode configuration information corresponding to the mode ID, the controlled device performs an operation corresponding to attribute information of "Action" in the Mode Activation Request message. It is assumed herein that the device IDs of controlled device 1 102a and controlled device 2 102b are included in the mode configuration information corresponding to the mode ID. Then controlled device 1 102a and controlled device 2 102b transmit, to the controller device 104, Mode Activation Response messages indicating completed execution of an operation corresponding to attribute information of "Action" in the received Mode Activation Request messages in operations 608a and 608b, respectively. In the absence of the device ID of a controlled device in the mode configuration information corresponding to the mode ID, the controlled device does not perform any operation and transmits, to the controller device 104, a Mode Activation Response message including information indicating that the controlled device is not supposed to perform the operation corresponding to the attribute information of "Action" in the received Mode Activation Request message.

Figures 7, 8A:
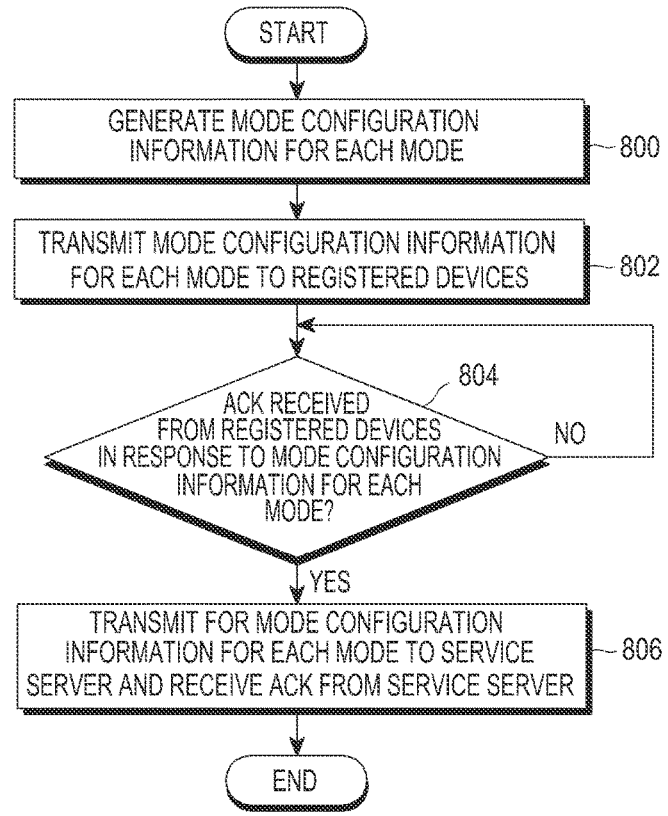
FIG. 7 illustrates a Mode Activation Request/Response message according to an embodiment of the present disclosure.
FIG. 8A is a flowchart illustrating a mode service creation and configuration procedure of a controller device according to an embodiment of the present disclosure.

FIG. 7 illustrates an exemplary Mode Activation Request/Response message according to an embodiment of the present disclosure.

Referring to FIG. 7, the Mode Activation Request message requests execution of an action for, for example, the away mode. Herein, the mode ID of the away mode is set as 1.1 in header information.

If a controlled device receiving the Mode Activation Request message determines the absence of a corresponding device ID in mode configuration information for the away mode identified by mode ID 1.1, the controlled device transmits a Mode Activation Response message with No Content set in it, indicating that the controlled device is not supposed to operate in the away mode identified by mode ID 1.1.

FIG. 8A is a flowchart illustrating a mode service creation and configuration procedure of a controller device according to an embodiment of the present disclosure.

Referring to FIG. 8A, the controller device, which has logged in to a service server, accesses the service server, acquires device information about devices registered to a smart home service, and generates mode configuration information for each mode, to implement a mode service for the registered devices in operation 800. The mode configuration information is generated in the afore-described mode service creation procedure and thus will not be described herein to avoid redundancy.

In operation 802, the controller device transmits the mode configuration information for each mode to the registered devices. The mode configuration information may be broadcast, sequentially transmitted, or relayed to the registered devices according to embodiments, which will be described later. The controller device then determines whether an ACKnowledgment (ACK) has been received from the devices in response to the mode configuration information for each mode. If the controller device has not received an ACK for the mode configuration information for each mode from a controlled device, the controller device awaits reception of the ACK.

Upon receipt of the ACK, the controller device transmits the mode configuration information for each mode to the service server in operation 806. Upon receipt of an ACK for the mode configuration information for each mode from the service server, the mode controller ends the mode service creation and configuration procedure.

Figure 8B:
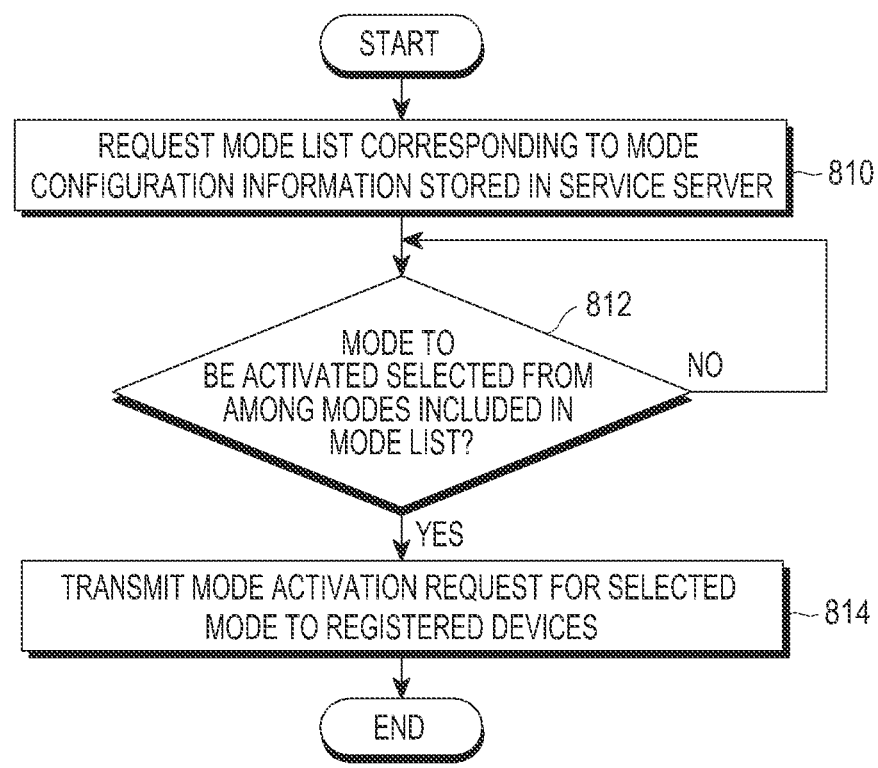
FIG. 8B is a flowchart illustrating a mode service activation procedure of a controller device according to an embodiment of the present disclosure.

FIG. 8B illustrates a mode service implementation procedure of a controller device according to an embodiment of the present disclosure.

Referring to FIG. 8B, the controller device has logged in to a service server and transmits a Mode List Request message to the service server, requesting a mode list corresponding to mode configuration information stored in the service server in operation 810. Upon receipt of the mode list from the service server, the controller device selects a mode to be activated from among modes included in the mode list and transmits a Mode Activation Request message to registered devices, requesting activation of the selected mode in operation 812. According to some embodiments, the Mode Activation Request message may be broadcast, transmitted sequentially, or relayed to the registered devices in operation 814.

According to an embodiment of the present disclosure, the controller device may broadcast mode configuration information for each mode, acquired in the afore-described procedure and a mode activation request requesting activation of a mode based on the mode configuration information for each mode to the controlled devices.

Figure 9A:
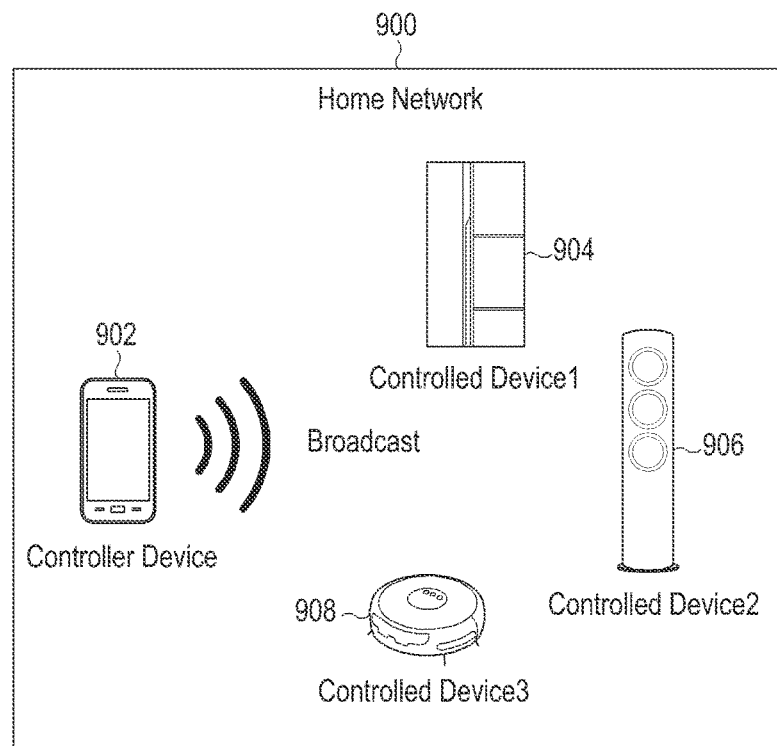
FIG. 9A is a view referred to for describing an operation for broadcasting mode configuration information and a mode activation request to controlled devices by a controller device according to an embodiment of the present disclosure.

FIG. 9A is a view referred to for describing an operation for broadcasting mode configuration information and a mode activation request to controlled devices by a controller device according to an embodiment of the present disclosure.

Referring to FIG. 9A, for example, a home network 900 includes a controller device 902 that provides a mode service to controlled devices (controlled device 1, controlled device 2 and controlled device 3) 904, 906 and 908 included in the home network 900. The controller device 902 may broadcast mode configuration information or a mode activation request for a specific mode according to the embodiments of FIGS. 2 to 8B to controlled device 1 904, for example, a refrigerator and controlled device 3 908, for example, a robot cleaner.

According to another embodiment, a controller device may transmit mode configuration information or a mode activation request to a specific controlled device and the controlled device may relay the mode configuration information or the mode activation request message to another controlled device.

Figure 9B:
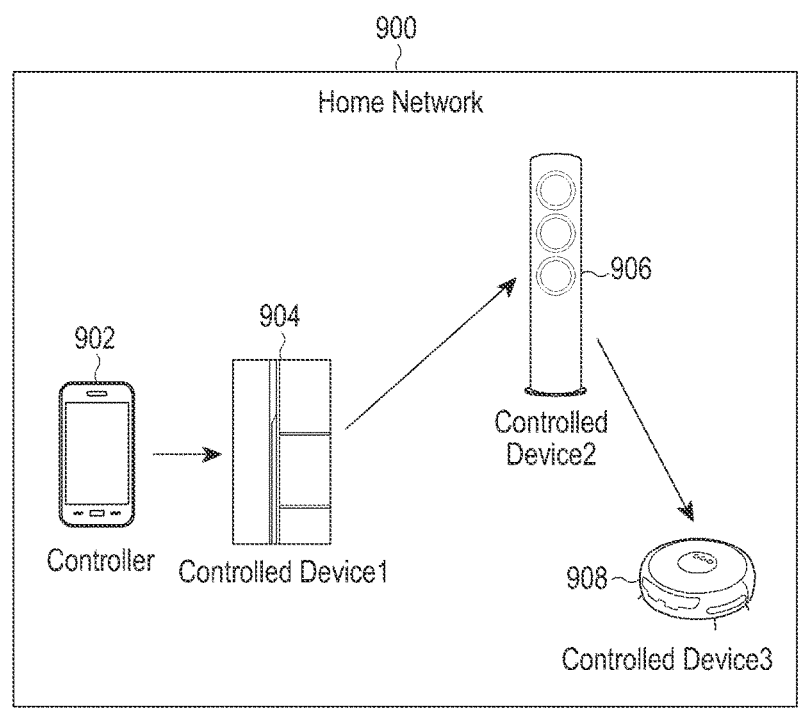
FIG. 9B is a view referred to for describing an operation for relaying mode configuration information or a mode activation request to controlled devices by a controller device according to an embodiment of the present disclosure.

FIG. 9B is a view referred to for describing an operation for relaying mode configuration information or a mode activation request to controlled devices by a controller device according to an embodiment of the present disclosure. For the convenience of description, a home network illustrated in FIG. 9B has the same configuration as the home network 900 illustrated in FIG. 9A.

Referring to FIG. 9B, the controller device 902 transmits mode configuration information or a mode activation request message to, for example, controlled device 1 904. Controlled device 1 904 forwards the received mode configuration information or mode activation request message to controlled device 2 906. Likewise, controlled device 2 906 forwards the received mode configuration information or mode activation request message to a third controlled device (controlled device 3) 908.

The above relay scheme enables transmission of mode configuration information or a mode activation request from one controlled device to another controlled device in various manners according to embodiments.

Figure 9C:
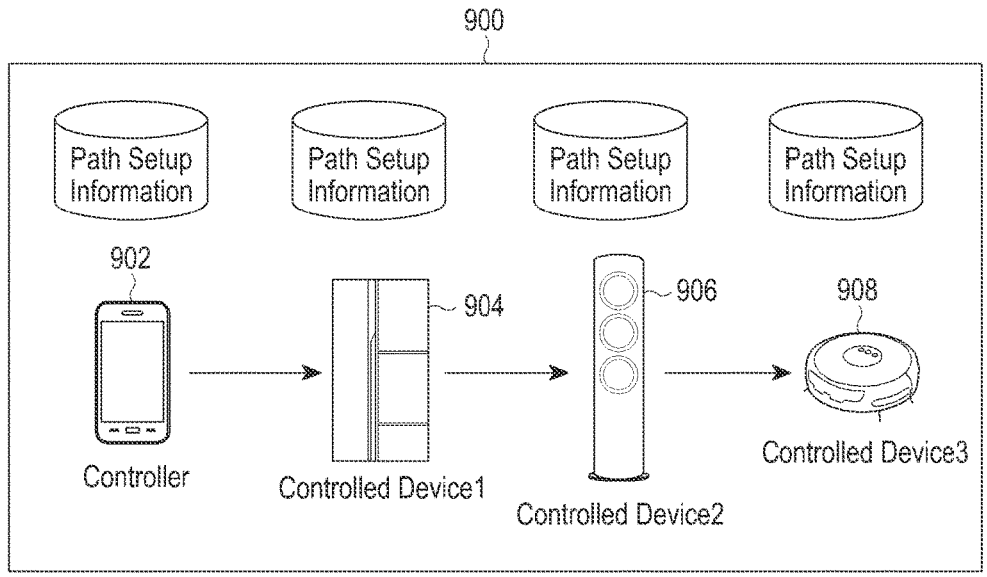
FIG. 9C illustrates a relay scheme based on a predetermined order according to another embodiment of the present disclosure.

FIG. 9C illustrates a relay scheme based on a predetermined order according to another embodiment of the present disclosure. For the convenience of description, a home network illustrated in FIG. 9C has the same configuration as the home network 900 illustrated in FIG. 9A.

Referring to FIG. 9B, it is assumed that mode configuration information or path setup information indicating an order of forwarding a mode activation request is pre-stored in each of the controller device 902, controlled device 1 904, controlled device 2 906, and controlled device 3 908. For example, it is assumed that the path setup information is set to the order of controlled device 1 904, controlled device 2 906, and controlled device 3 908. Thus, the controller device 902 transmits the mode configuration information or the mode activation request to controlled device 1 904 set as the first controlled device according to the order indicated by the path setup information. Upon receipt of the mode configuration information or the mode activation request, controlled device 1 904 forwards the mode configuration information or the mode activation request to controlled device 2 906 set as the second controlled device according to the order indicated by the path setup information. Finally, controlled device 2 906 forwards the mode configuration information or the mode activation request to controlled device 3 908 set as the next controlled device according to the order indicated by the path setup information.

According to another embodiment, the path setup information may be included in the mode configuration information. In this case, upon receipt of a mode activation request from a controller device, controlled devices recognize that they are to forward the mode activation request by their IDs set in the path setup information included in the mode configuration information and forward the mode activation request to predetermined controlled devices.

Figure 9D:
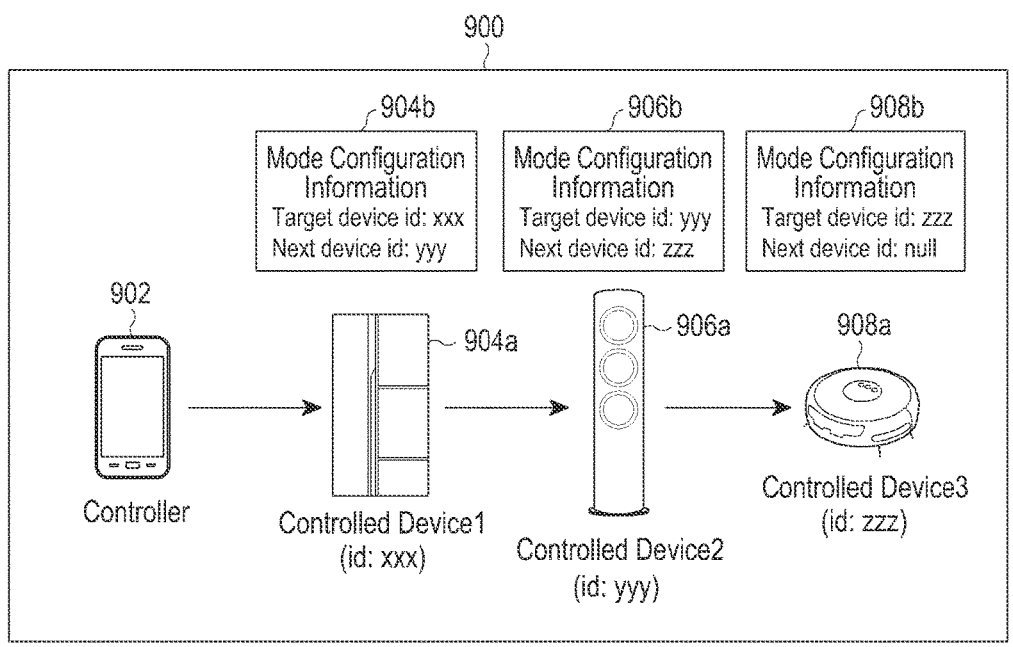
FIG. 9D illustrates a relay scheme based on path setup information included in mode configuration information according to another embodiment of the present disclosure.

FIG. 9D illustrates a relay scheme based on path setup information included in mode configuration information according to another embodiment of the present disclosure. For the convenience of description, a home network illustrated in FIG. 9D has the same configuration as the home network 900 illustrated in FIG. 9A.

Referring to FIG. 9D, the controller device 902 transmits mode configuration information 904b to one of registered controlled devices, controlled device 1 904a. It is assumed that a target device ID is set to the ID of controlled device 1 904a, 'xxx' and a next device ID identifying the next device to receive the mode configuration information is set to the ID of controlled device 2 906a, 'yyy'. Then controlled device 1 904a forwards mode configuration information 906b to controlled device 2 906a identified by the next device ID. The mode configuration information 906b also includes a target device ID and a next device ID. When controlled device 2 906a determines that the next device ID for the mode configuration information 906b is 'zzz' indicating controlled device 3 908a, controlled device 2 906a forwards mode configuration information 906b to controlled device 3 908a. Since there is no more controlled device to which to forward the mode configuration information 908b, the mode configuration information 908b includes a next device ID set to 'null'.

Figure 9E:
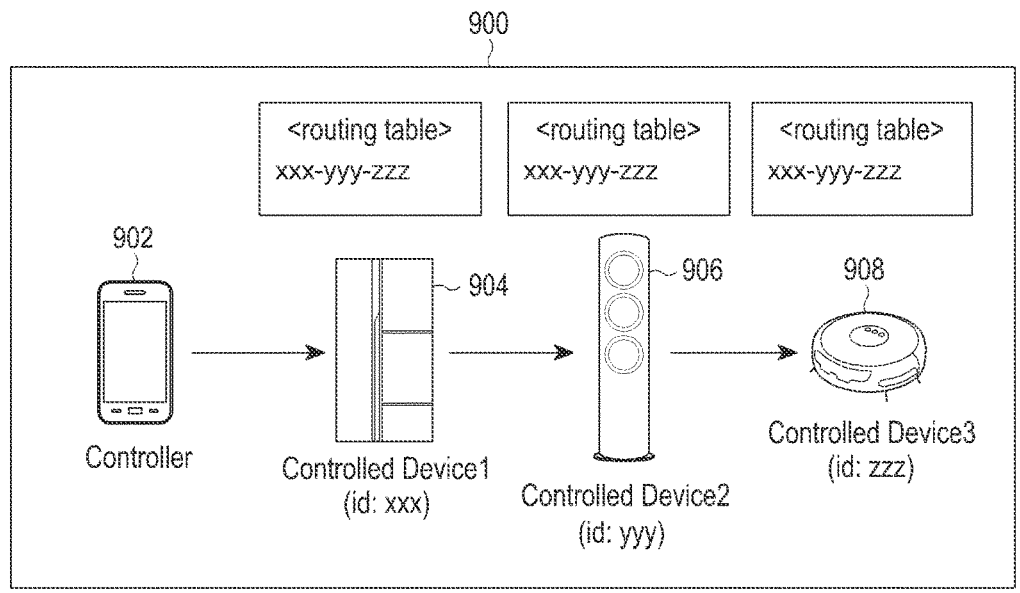
FIG. 9E illustrates a relay scheme for relaying mode configuration information or a mode activation request based on a routing table set by a controller device according to another embodiment of the present disclosure.

FIG. 9E illustrates a relay scheme for relaying mode configuration information or a mode activation request message based on a routing table made by a controlled device according to another embodiment of the present disclosure. It is assumed that a home network illustrated in FIG. 9E has the same configuration as the home network 900 illustrated in FIG. 9A.

Referring to FIG. 9E, it is assumed that the controller device 902 determines controlled device 1 904, from among registered controller devices, to be the first controlled device to receive mode configuration information or a mode activation request and makes a routing table for sequentially forwarding the mode configuration information or the mode activation request. For example, it is assumed that the routing table lists the device IDs of controlled devices to which the mode configuration information or the mode activation request are to be forwarded. For example, if the routing table is set to 'xxx→yyy→zzz', controlled device 1 904 identified by the device ID 'xxx' of the first device to receive the routing table forwards the routing table along with the mode configuration information or the mode activation request to the next controlled device identified by 'yyy' following 'xxx', that is, controlled device 2 906. Controlled device 2 906 also forwards the routing table along with the mode configuration information or the mode activation request to controlled device 3 908 identified by 'zzz' following 'yyy'.

Figure 9F:
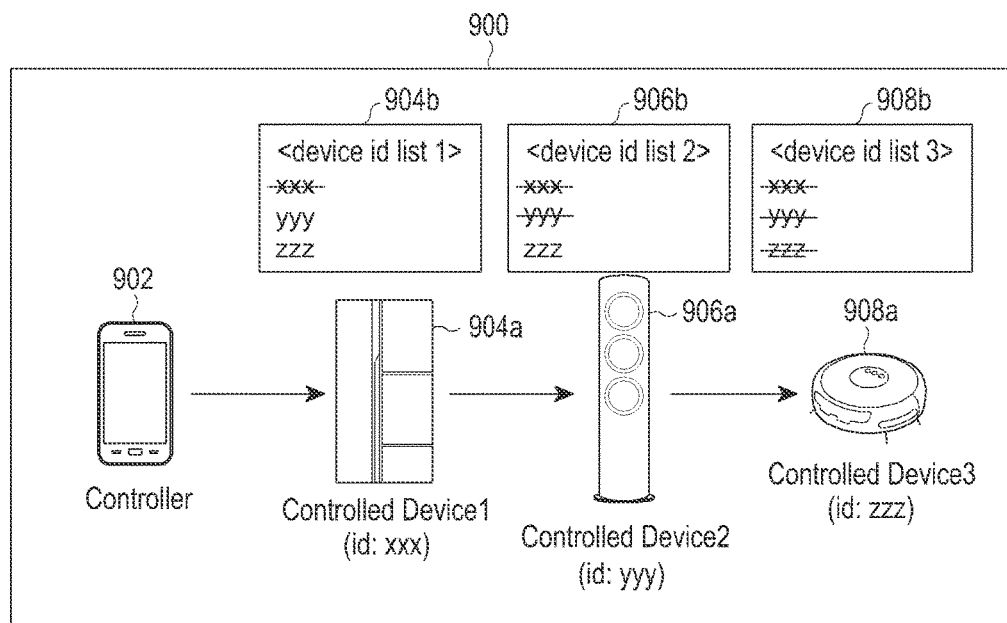
FIG. 9F illustrates a relay scheme for relaying a device Identifier (ID) list indicating a relay order set randomly by a controller device according to an embodiment of the present disclosure.

FIG. 9F illustrates a relay scheme for relaying a device ID list indicating a relay order set randomly by a controller device according to an embodiment of the present disclosure.

Referring to FIG. 9F, the controller device 902 makes a device ID list with the device IDs of controlled devices to which mode configuration information or a mode activation request is to be transmitted. Then the controller device 902 randomly selects one of the controlled devices listed in the device ID list and transmits the device list along with the mode configuration information or the mode activation request to the selected controlled device. It is assumed that the controller device 902 selects controlled device 1 904*a*. Then controlled device 1 904*a* makes a first device ID list (list 1) 904*b* by deleting a corresponding device ID 'xxx' in the received device ID list and randomly selects a device ID between the remaining device IDs 'yyy' and 'zzz' in device ID list 1 904*b*. If the selected device ID is 'yyy', controlled device 1 904*a* transmits device ID list 1 904*b* along with the mode configuration information or the mode activation request to controlled device 2 906*a* identified by 'yyy'. Similarly, controlled device 2 906*a* makes a second device ID list (list 2) 906*b* by deleting a corresponding device ID 'yyy' in the received device ID list 1 904*b*. Since 'zzz' remains in device ID 2 906*b*, controlled device 2 906*a* transmits device ID list 2 906*b* along with the mode configuration information or the mode activation request to controlled device 3 908*a* identified by 'zzz'. Similarly, controlled device 3 908*a* makes a third device ID list (list 3) 908*b* by deleting a corresponding device ID 'zzz' in the received device ID list 2 906*b*. While it has been described herein that the device ID list includes three controlled devices, the above operation is repeated until all IDs of the device ID list are deleted in the foregoing embodiment.

It may be further contemplated as another embodiment that a controller device transmits mode configuration information through a gateway installed in a home network. Also in this embodiment, the gateway may directly transmit or broadcast the mode configuration information received from the controller device to controlled devices in the home network.

Figures 10A, 10B:
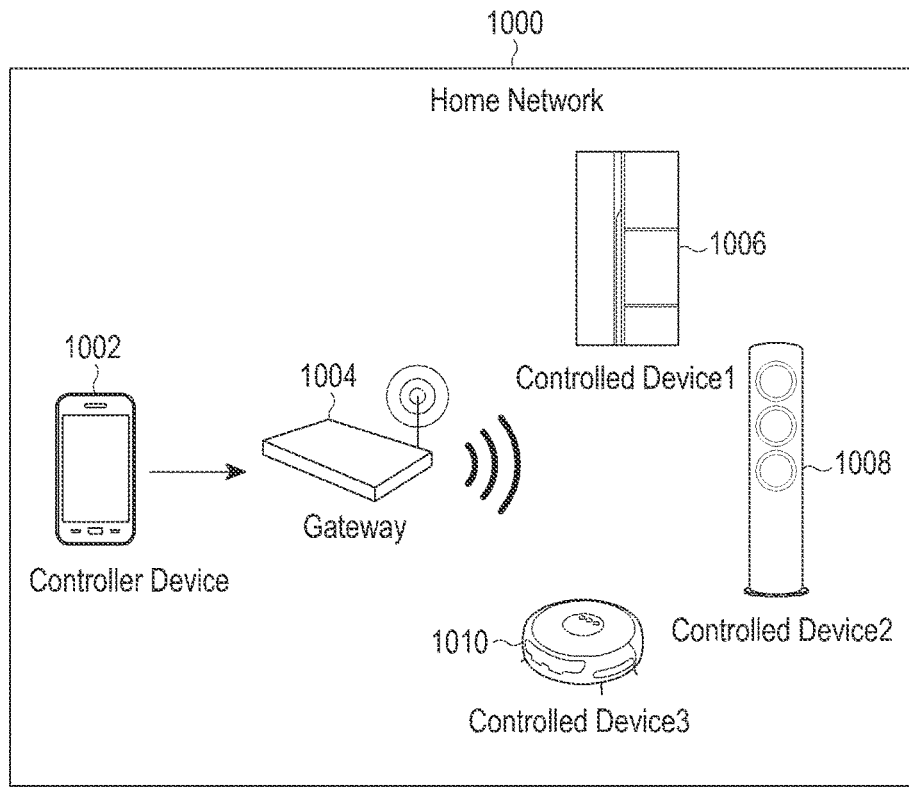
FIG. 10A is a view referred to for describing a method for broadcasting mode configuration information configured by a controller device to controlled devices through a gateway according to an embodiment of the present disclosure.
FIG. 10B illustrates modified mode configuration information stored by a gateway according to an embodiment of the present disclosure.

FIG. 10A illustrates a method for broadcasting mode configuration information to controlled devices through a gateway by a controller device according to an embodiment of the present disclosure.

Referring to FIG. 10A, a home network 1000 includes a gateway 1004 in addition to a controller device 1002, controlled device 1 1006, controlled device 2 1008, and controlled device 3 1010.

In the embodiment of FIG. 10A, the controller device 1002 configures mode configuration information for each mode, as illustrated in FIGS. 3 and 4. The controller device 1002 transmits the mode configuration information for each mode to the gateway 1004 within the home network 1000. In this case, the mode configuration information is configured according to the embodiment of FIG. 3.

Upon receipt of the mode configuration information for each mode from the controller device 1002, the gateway 1004 may modify and store the mode configuration information by writing an owner that has configured the mode configuration information as illustrated in FIG. 10B.

FIG. 10B illustrates an example of modified mode configuration information stored by a gateway.

Referring to FIG. 10B, mode configuration information is configured according to the embodiment of FIG. 3, except that the mode configuration information further includes the device ID of an owner that has configured the mode configuration information and the device ID of the owner indicates the controller device 1002.

Then the gateway 1004 may broadcast the modified mode configuration information to controlled device 1 1006, controlled device 2 1008, and controlled device 3 1010. According to some embodiments, the gateway 1004 may modify, store, and broadcast immediately after receiving the mode configuration information from the controller device 1002. In another embodiment, if a plurality of pieces of mode configuration information exist for the same owner, the gateway 1004 may broadcast the plurality of pieces of mode configuration information with an owner set to the same device ID at once to controlled device 1 1006, controlled device 2 1008, and controlled device 3 1010.

Figure 10C:
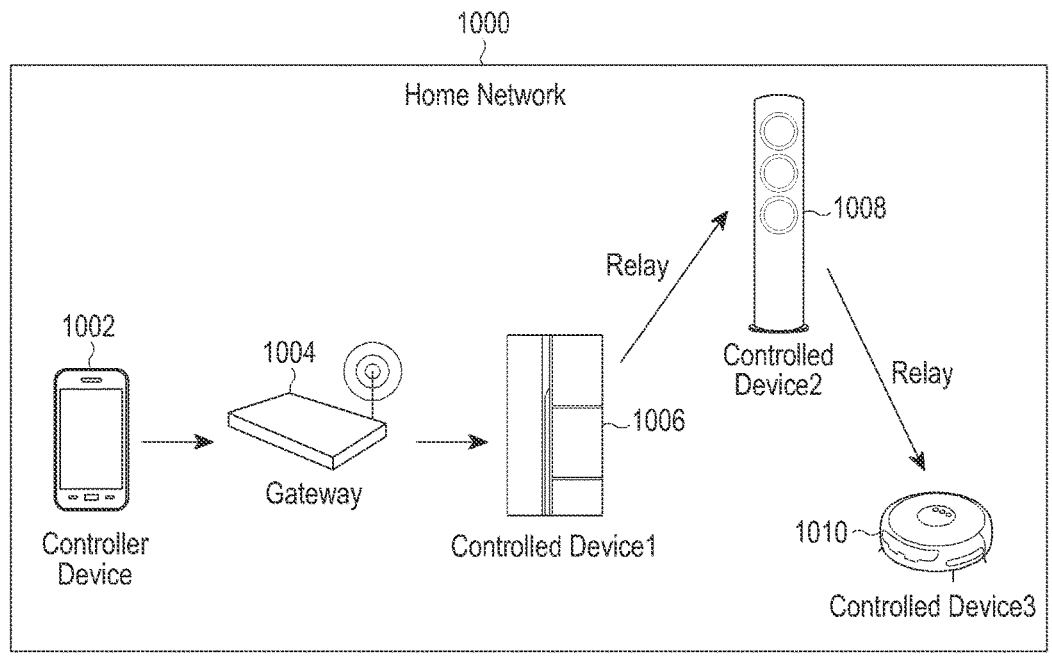
FIG. 10C is a view referred to for describing a method for relaying mode configuration information configured by a controller device to controlled devices through a gateway according to another embodiment of the present disclosure.

FIG. 10C illustrates a method for relaying mode configuration information configured by a controller device to controlled devices through a gateway according to another embodiment of the present disclosure. For the convenience of description, it is assumed that a home network illustrated in FIG. 10C has the same configuration as the home network 1000 illustrated in FIG. 10A.

Referring to FIG. 10C, if the controller device 1002 transmits mode configuration information for each mode, which has been configured according to the embodiment of FIG. 3, to the gateway 1004, the gateway 1004 stores the mode configuration information with an owner set to the device ID of the controller 1002 as illustrated in FIG. 10B. Then the gateway 1004 may transmit the mode configuration information for each mode to controlled devices according to the relay schemes illustrated in FIGS. 9C to 9F. In this case, the mode configuration information may be relayed in a predetermined order or based on path setup information included in the mode configuration information. Or the mode configuration information may be relayed based on a routing table made by the controller 1002 or a randomly set device ID list, which has been described before with reference to FIGS. 9C to 9F.

After the mode configuration information is stored in each of controlled device 1 1006, controlled device 2 1008, and controlled device 3 1010 in the above-described embodiments of the present disclosure, the controller device 1002 may transmit a mode activation request for activating a mode to the gateway 1004. Then the gateway 1004 checks the device ID of the controller device that has transmitted the mode activation request.

An element, 'description' indicating the name of mode configuration information in the mode configuration information is set by a user. Therefore, there may exist a plurality of pieces of mode configuration information with the same description. Accordingly, upon receipt of a request for transmission of an activation request, the gateway 1004 determines whether there is mode configuration information with the same description. If a plurality of pieces of mode configuration information with the same description exist, the gateway 1004 may determine a user device using the device ID of the controller device that has transmitted the mode activation request in order to activate a mode corresponding to the mode configuration information of the user device. The gateway 1004 may select mode configuration information with an owner corresponding to the device ID from among a plurality of pieces of mode configuration information with the same description and transmit the selected mode configuration information by broadcasting or relaying in the afore-described methods.

Figure 11:
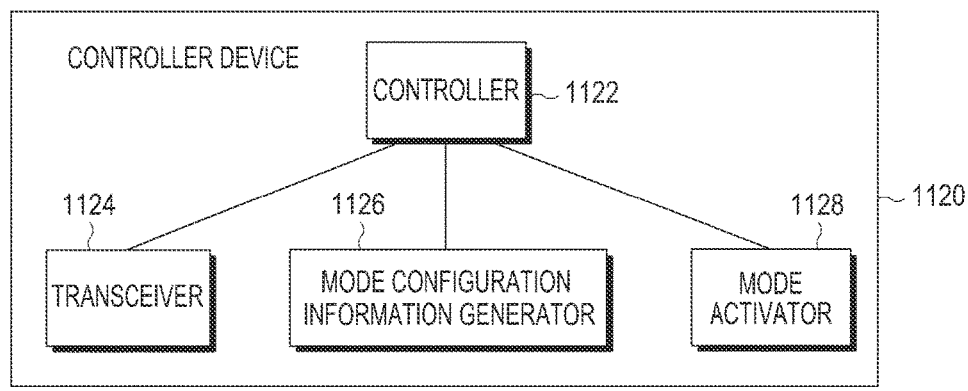
FIG. 11 is a block diagram of a controller device that provides a mode service according to an embodiment of the present disclosure.

FIG. 11 is a block diagram of a controller device that provides a mode service according to an embodiment of the present disclosure.

Referring to FIG. 11, a controller device 1120 may include, for example, a controller 1122, a transceiver 1124, a mode configuration information generator 1126, and a mode activator 1128. While the controller device 1120 is described as including units that perform operations according to embodiments of the present disclosure, for the convenience of description, a plurality of units may be incorporated into a single unit or a single unit may be divided into a plurality of units in the controller device 1120 according to an operator's intent or according to some embodiments.

The controller 1122 controls operations of the controller device 1120 for providing a mode service according to an embodiment of the present disclosure.

The controller 1122 acquires device information about devices registered to a smart home service through the transceiver 1124 in a logged-in state to a service server. The controller 1122 controls the mode configuration information generator 1126 to generate and configure the afore-described mode configuration information for each mode based on the device information about the registered devices. The controller 1122 requests a mode list corresponding to mode configuration information stored in the service server to the service server and receives the mode list. Then the controller 1122 controls selection of a mode to be activated from among modes listed in the mode list and controls the transceiver 1124 to transmit a mode activation request for the selected mode to the registered devices. The controller 1122 may transmit the mode configuration information and the mode activation request to the registered devices by broadcasting or relaying according to the embodiments of FIGS. 9A to 10C.

Figure 12A:
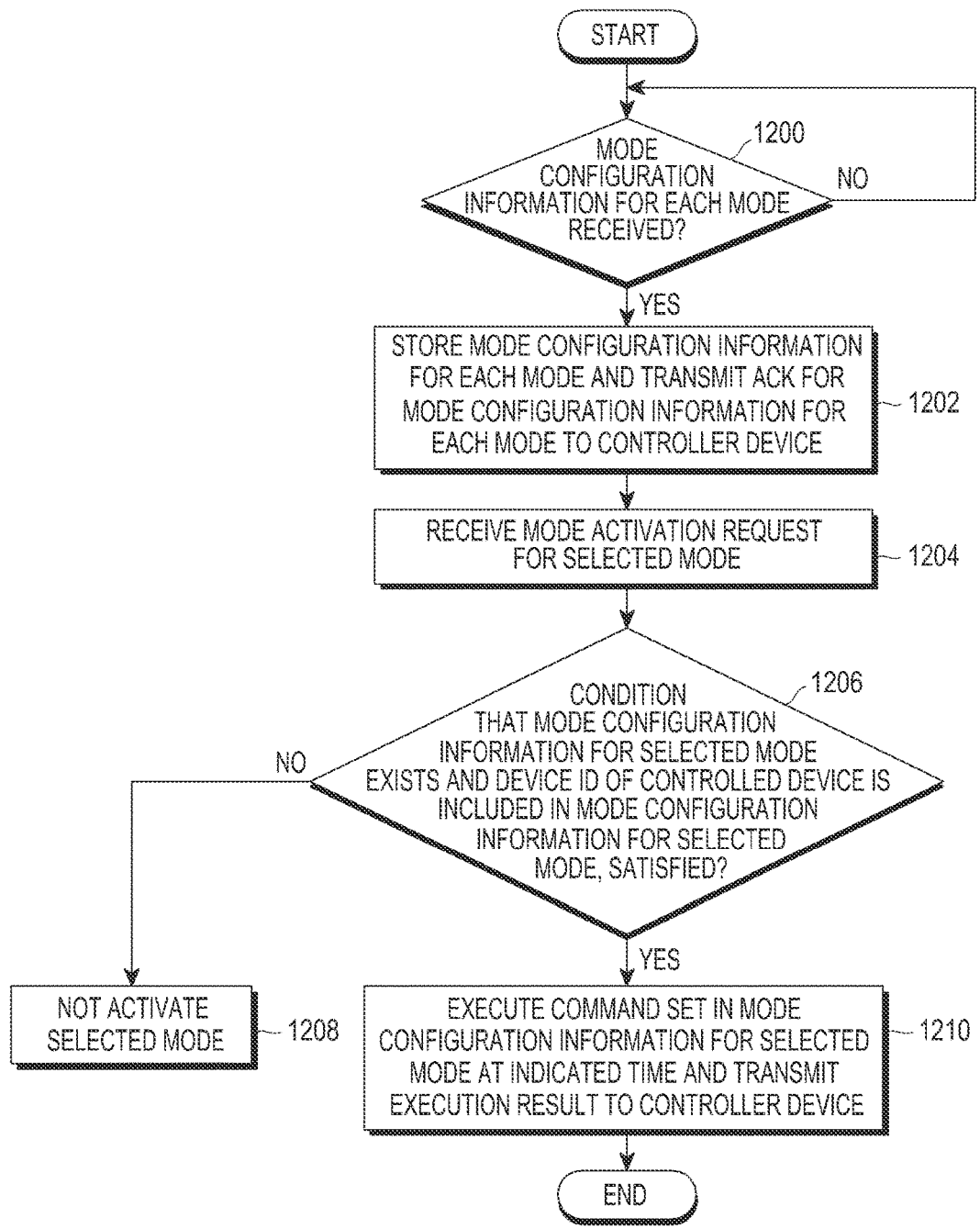
FIG. 12A is a flowchart illustrating an operation for performing a mode service by a controlled device according to an embodiment of the present disclosure.

FIG. 12A is a flowchart illustrating an operation for performing a mode service by a controlled device according to an embodiment of the present disclosure.

Referring to FIG. 12A, upon receipt of mode configuration information for each mode through a controller device in a home network to which the controlled device belongs in operation 1200, the controlled device stores the mode configuration information for each mode and then transmits an ACK indicating reception of the mode configuration information for each mode to the controller device in operation 1202. As described before, a plurality of pieces of mode configuration information for the same mode may be stored separately according to user IDs. According to another embodiment, the controlled device may receive the mode configuration information for each mode through a gateway. The mode configuration information for each mode may be received through the controller device or the gateway by broadcasting or from a previous controlled device by relaying according to an embodiment. The reception operation has been described before with reference to FIGS. 9A to 10C.

Upon receipt of a mode activation request for a selected mode from the controller device in operation 1204, the controlled device determines whether the mode configuration information for each mode stored in the controlled device includes mode configuration information for the selected mode and in the presence of the mode configuration information for the selected mode, determines whether the mode configuration information includes the device ID of the controlled device in operation 1206.

In the absence of the mode configuration information for the selected mode, or in the absence of a corresponding device ID in the mode configuration information for the selected mode although there is the mode configuration information for the selected mode, the controlled device does not activate the selected mode in operation 1208.

On the contrary, in the presence of a corresponding device ID in the mode configuration information for the selected mode, the controlled device executes a command set in the mode configuration information for the selected mode at a time set in the mode configuration information and transmits an execution result to the controller device in operation 1210.

Figure 12B:
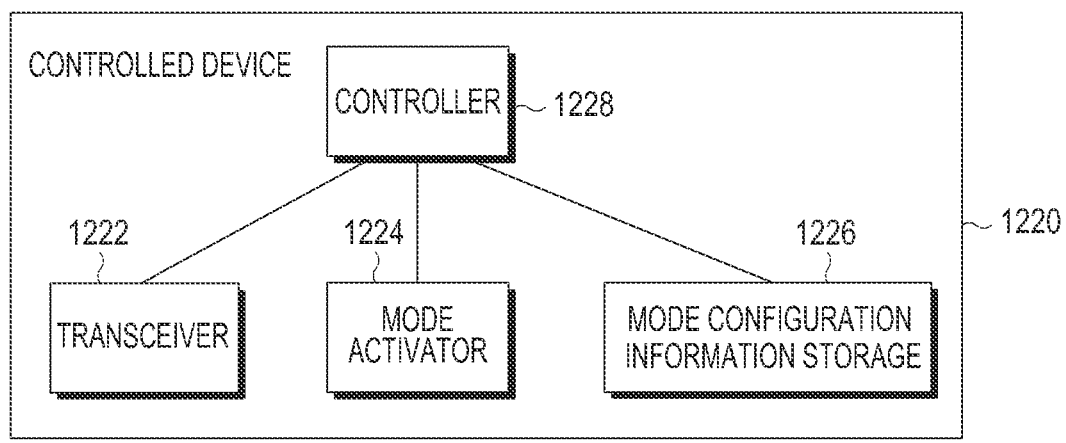
FIG. 12B is a block diagram of a controlled device that performs a mode service according to an embodiment of the present disclosure.

FIG. 12B is a block diagram of a controlled device that performs a mode service according to an embodiment of the present disclosure.

Referring to FIG. 12B, a controlled device 1220 may include, for example, a transceiver 1222, a mode activator 1224, a mode configuration information storage 1226, and a controller 1228. While the controlled device 1220 is described as including units that perform operations according to embodiments of the present disclosure, for the convenience of description, a plurality of units may be incorporated into a single unit or a single unit may be divided into a plurality of units in the controlled device 1220 according to an operator's intent or according to some embodiments.

The controller 1228 confirms reception of mode configuration information for each mode from a controller device or a gateway through the transceiver 1222. The mode configuration information for each mode may be received through the controller device or the gateway by broadcasting or from a previous controlled device by relaying. The reception operation has been described before with reference to FIGS. 9A to 10C. The controller 1228 stores the mode configuration information for each mode in the mode configuration information storage 1226. Upon receipt of a mode activation request for a mode selected by the controller device from the controller device, the controller 1228 determines whether there is mode configuration information for the selected mode in the mode configuration information for each mode stored in the mode configuration information storage 1226. In the presence of mode configuration information for the selected mode, the controller 1228 determines whether the device ID of the controlled device 1220 is included in the mode configuration information for the selected mode. In the presence of the device ID of the controlled device 1220, the controller 1228 controls the mode activator 1224 to execute an action mapped to the device ID in the mode configuration information at a time set to execute the action. On the contrary, in the absence of the device ID of the controlled device 1220, the controller 1228 controls the mode activator 1224 to ignore the request for activating the selected mode.

The proposed method and apparatus for controlling devices for a smart home service may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like.

As is apparent from the foregoing description of the present disclosure, since a controller device may simultaneously control a plurality of services registered to a smart home service by transmitting a single command generated based on information preset by the controller device, user convenience may be increased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A method to control devices for a home service by a controller device, the method comprising:
 generating configuration information of a mode based on information on devices selected to operate in the mode;

transmitting, to the selected devices, the configuration information comprising information identifying the selected devices and information indicating at least one action intended to be operated by the selected devices in the mode; and transmitting an activation request for activating the mode to the selected devices, wherein the at least one action comprises an action which is intended to be commonly operated by at least two or more of the selected devices of different types in the mode.

2. The method of claim 1, wherein at least one of the configuration information or the activation request is broadcasted.

3. The method of claim 1, wherein at least one of the configuration information or the activation request is transmitted to the selected devices in relay based on a predetermined relay order.

4. The method of claim 1, wherein the configuration information further comprises at least one of execution time information of the at least one action, path information indicating a relay order for relaying the configuration information, or information indicating whether the configuration information is to be reused.

5. The method of claim 1, wherein the configuration information further comprises information identifying the controller device.

6. The method of claim 1, wherein transmitting the configuration information comprises:

transmitting, to a gateway, the configuration information in order that the gateway transmits, to the selected devices, the configuration information comprising information identifying the controller device.

7. A method for executing a home service by a device, the method comprising:

receiving configuration information of a mode generated based on information on devices selected to operate in the mode;

obtaining, if an activation request for activating the mode is received, information identifying the selected devices and information indicating at least one action intended to be operated by the selected devices in the mode included in the configuration information;

executing an action of the device indicated by the information indicating the at least one action; and transmitting a result of the execution to a controller device, wherein the at least one action comprises an action which is intended to be commonly operated by at least two or more of the selected devices of different types in the mode.

8. The method of claim 7, wherein at least one of the configuration information or the activation request is broadcasted from the controller device.

9. The method of claim 7, wherein at least one of the configuration information or the activation request is received in relay based on a predetermined relay order.

10. The method of claim 7, wherein the configuration information further comprises at least one of execution time information of the at least one action, path information indicating a relay order of relaying the configuration information, or information indicating whether the configuration information is to be reused.

11. The method of claim 7,
wherein the configuration information is received from a gateway, and wherein the configuration information is transmitted from the controller device to the gateway in order that the gateway transmits, to the selected devices, the configuration information comprising information identifying the controller device.

12. The method of claim 11, further comprising:

receiving at least one configuration information from the gateway; and storing each configuration information mapped to information identifying each controller device included in each of the at least one configuration information.

13. The method of claim 7, further comprising:

determining whether there is configuration information of a first mode among configuration information of each mode restored in the device if an activation request for activating the first mode is received;

executing, when there is the restored configuration information of the first mode, an action of the device indicated by information indicating at least one action included in the configuration information of the first mode; and discarding, when there is not the restored configuration information of the first mode, the activation request for activating the first mode.

14. A control device to control devices for a home service, the control device comprising:

at least one processor configured to generate configuration information of a mode based on information on devices selected to operate in the mode; and a transceiver configured to:

transmit, to the selected devices, the configuration information comprising information identifying the selected devices and information indicating at least one action intended to be operated by the selected devices in the mode, and transmit an activation request for activating the mode to the selected devices, wherein the at least one action comprises an action which is intended to be commonly operated by at least two or more of the selected devices of different types in the mode.

15. The control device of claim 14, wherein at least one of the configuration information or the activation request is broadcasted.

16. The control device of claim 14, wherein at least one of the configuration information or the activation request is transmitted to the selected devices in relay based on a predetermined relay order.

17. The control device of claim 14, wherein the configuration information further comprises at least one of execution time information of the at least one action, path information indicating a relay order for relaying the configuration information, or information indicating whether the configuration information is to be reused.

18. The control device of claim 14, wherein the configuration information further comprises information identifying the controller device.

19. The control device of claim 14, wherein the transceiver is configured to transmit, to a gateway, the configuration information in order that the gateway transmits, to the selected devices, the configuration information comprising information identifying the controller device.

20. A device for executing a home service, the device comprising:

a receiver configured to receive configuration information of a mode generated based on information on devices selected to operate in the mode;

at least one processor configured to, if an activation request for activating the mode is received:
obtain information identifying the selected devices and information indicating at least one action intended to be operated by the selected devices in the mode included in the configuration information, and
execute an action of the device indicated by the information indicating the at least one action; and
a transmitter configured to transmit a result of the execution to a controller device,
wherein the at least one action comprises an action which is intended to be commonly operated by at least two or more of the selected devices of different types in the mode.

21. The device of claim 20, wherein at least one of the configuration information or the activation request is broadcasted from the controller device.

22. The device of claim 20, wherein at least one of the configuration information or the activation request is received in relay based on a predetermined relay order.

23. The device of claim 20, wherein the configuration information further comprises at least one of execution time information of the at least one action, path information indicating a relay order of relaying the configuration information, or information indicating whether the configuration information is to be reused.

24. The device of claim 20,
wherein the configuration information is received from a gateway, and
wherein the configuration information is transmitted from the controller device to the gateway in order that the gateway transmits, to the selected devices, the configuration information comprising information identifying the controller device.

25. The device of claim 24,
wherein the receiver is further configured to receive at least one configuration information from the gateway, and
wherein the at least one processor is further configured to store each configuration information mapped to information identifying each controller device included in each of the at least one configuration information.

26. The device of claim 20, wherein the at least one processor is further configured to:
determine whether there is configuration information of a first mode among configuration information of each mode restored in the device if an activation request for activating the first mode is received,
execute, when there is the restored configuration information of the first mode, an action of the device indicated by information indicating at least one action included in the configuration information of the first mode, and
discard, when there is not the restored configuration information of the first mode, the activation request for activating the first mode.

* * * * *